(12) United States Patent
Wieckowski et al.

(10) Patent No.: US 12,439,479 B2
(45) Date of Patent: Oct. 7, 2025

(54) OHMIC HEATER WITH MULTIPLE OPERATING STATES

(71) Applicant: OhmIQ, Inc., North Charleston, SC (US)

(72) Inventors: Michael J. Wieckowski, Charleston, SC (US); Jeremiah M. Callahan, Sullivan's Island, SC (US); Weston Scott Catron, Charleston, SC (US)

(73) Assignee: OHMIQ, INC., North Charleston, SC (US)

( * ) Notice: Subject to any disclaimer, the term of this patent is extended or adjusted under 35 U.S.C. 154(b) by 878 days.

(21) Appl. No.: 16/952,888

(22) Filed: Nov. 19, 2020

(65) Prior Publication Data
US 2021/0153302 A1  May 20, 2021

Related U.S. Application Data

(60) Provisional application No. 62/937,877, filed on Nov. 20, 2019.

(51) Int. Cl.
*H05B 3/00* (2006.01)
*F24H 1/20* (2022.01)
*H05B 3/03* (2006.01)

(52) U.S. Cl.
CPC .......... *H05B 3/0019* (2013.01); *F24H 1/202* (2013.01); *H05B 3/03* (2013.01)

(58) Field of Classification Search
CPC ... F24H 1/203; F24H 1/54; F24H 1/20; F24H 1/202; H05B 3/0004; H05B 3/0009;
(Continued)

(56) References Cited

U.S. PATENT DOCUMENTS 6,130,990 A   10/2000   Herrick et al.
7,050,706 B2   5/2006   Israelsohn et al.
(Continued)

FOREIGN PATENT DOCUMENTS

CA   1291785 C   11/1991
CN   102143620 A   8/2011
(Continued)

OTHER PUBLICATIONS

International Search Report including Written Opinion for Application No. PCT/US2020/061283, dated Feb. 9, 2021, 13 pages.
(Continued)

*Primary Examiner* — Steven W Crabb
*Assistant Examiner* — Theodore J Evangelista
(74) *Attorney, Agent, or Firm* — CARTER, DELUCA & FARRELL LLP (57) ABSTRACT

An ohmic heater has a structure (20) defining a flow path extending in a downstream direction (D), a first pair of electrodes (34a,34b) and a second pair of electrodes (36a, 36b). The electrodes of each pair are adjacent one another in the downstream direction but spaced from one another in a direction perpendicular to the downstream direction; the pairs of electrodes are spaced apart from one another in the downstream direction. An electrical circuit (40,42,44,46,48, 50) is operative to apply a voltage (i) between the electrodes (34a,34b) of the first pair; or (ii) between the electrodes (36a,36b) of the second pair; or (iii) between at least one
(Continued)

electrode (34a) of the first pair and at least one electrode (36b) of the second pair, and may vary the applied voltage. The heater can meet varying conditions such as changes in conductivity of the liquid flowing through the heater.

16 Claims, 3 Drawing Sheets

(58) Field of Classification Search
CPC .. H05B 3/0014; H05B 3/0023; H05B 3/0052; H05B 3/0071; H05B 3/60; H05B 3/00; H05B 3/0019; H05B 3/03
See application file for complete search history.

(56) References Cited

U.S. PATENT DOCUMENTS

| | | | |
|---|---|---|---|
| 8,532,474 | B2 | 9/2013 | Campbell |
| 11,353,241 | B2* | 6/2022 | Callahan ............... F24H 1/106 |
| 2005/0013595 | A1* | 1/2005 | Israelson ............... F24H 15/281 |
| | | | 392/449 |
| 2006/0291527 | A1 | 12/2006 | Callahan et al. |
| 2007/0223892 | A1 | 9/2007 | Chaput |
| 2010/0322605 | A1 | 12/2010 | van Aken et al. |
| 2011/0008026 | A1 | 1/2011 | Campbell |
| 2011/0095010 | A1* | 4/2011 | Bondarowicz .......... F24H 15/37 |
| | | | 219/209 |

FOREIGN PATENT DOCUMENTS

| | | | |
|---|---|---|---|
| EP | 2757330 | A1 | 7/2014 |
| JP | 2005502017 | A | 1/2005 |
| JP | 2006064327 | A | 3/2006 |
| JP | 2011511919 | A | 4/2011 |
| JP | 6588669 | B1 * | 10/2019 |
| WO | 03016791 | A1 | 2/2003 |
| WO | 2005020175 | A1 | 3/2005 |
| WO | 2008116247 | A1 | 10/2008 |
| WO | 2009100486 | A1 | 8/2009 |
| WO | WO-2018085773 | A1 * | 5/2018  ............. F24H 1/106 |

OTHER PUBLICATIONS

Chinese Second Office Action for Application No. 202080088558.3 dated Apr. 14, 2025, English Translation, 8 pages.
Mexico Office Action for Application No. MX/a/2022/006185 dated Feb. 18, 2025, English Translation, 5 pages.
Chinese Search Report for 202080088558.3, dated Sep. 6, 2024, 2 pages. [See p. 1, characterizing the cited references].

* cited by examiner

OHMIC HEATER WITH MULTIPLE OPERATING STATES

CROSS REFERENCE TO RELATED APPLICATIONS

The present application claims benefit of U.S. Provisional Patent Application 62/937,877 filed Nov. 20, 2019.

BACKGROUND OF THE INVENTION

The present disclosure relates to ohmic liquid heating devices and to methods of heating a liquid. An ohmic liquid heater includes a structure for containing the liquid to be heated and a plurality of electrodes spaced apart from one another. The electrodes are contacted with the fluid to be heated so that the liquid fills the spaces between neighboring electrodes. An electrical voltage is applied between electrodes and a current passes between the electrodes through the liquid so that the liquid is heated by power dissipated in the electrical resistance of the liquid itself. The heating rate varies with the square of the current and varies inversely with the electrical resistance of the liquid between the energized electrodes. The current varies with the conductivity of the liquid. For a liquid of a given conductivity, the current varies with the spacing between the electrodes. Closely spaced electrodes provide a low-resistance current path and thus provide a high current and a high heating rate. The current and the heating rate also vary with the area of the electrodes; larger electrodes provide higher currents. The term "specific resistance" as used in this disclosure to characterize a circuit or a part of a circuit having elements electrically connected by a liquid refer to the ratio between the electrical resistance of the circuit or part of the circuit and the electrical resistivity of the liquid in the circuit. An ohmic heater as described, for example, in CA 1291785 uses numerous pairs of electrodes of different sizes so that each pair of electrodes defines a different specific resistance. The electrodes of each pair are plate-like elements which confront one another so as to define a space between them. A liquid flow path extends through the spaces defined by the various pairs in sequence. The desired heating rate is achieved by selecting pairs of electrodes and connecting the electrodes of each pair to opposite poles of a power supply. A heater as disclosed in WO 2009/100486 uses a generally similar arrangement, and further controls the heating rate by rapidly closing and opening the switches which collect the electrodes of each pair to the power supply so as to vary the average voltage applied over time in a pulse width modulation scheme. Another ohmic heater which utilizes multiple pairs of electrodes is disclosed in U.S. Pat. No. 8,532,474. However, further improvement would be desirable.

SUMMARY

One aspect of the invention provides an ohmic heater. An ohmic heater according to this aspect of the invention desirably includes a structure defining a flow path extending in a downstream direction. The heater desirably includes a first pair of electrodes disposed within the flow path adjacent one another in the downstream direction but spaced from one another in a direction perpendicular to the downstream direction. Desirably, the heater also includes a second pair of electrodes disposed within the flow path downstream from the first pair of electrodes, the electrodes of the second pair being within the flow path adjacent one another in the downstream directions but spaced from one another in a direction perpendicular to the downstream direction. Merely by way of example, the structure may include an elongated tube formed from a dielectric material, the electrodes of the first pair may confront one another at one location along the tube and the electrodes of the second pair may confront one another at another location downstream from the first electrodes. In this example, the tubular dielectric structure may define an elongated passage extending between the first electrodes and the second electrodes. The heater also desirably includes an electrical circuit operative in at least three states. The states desirably include (i) a first state in which the circuit applies a voltage between the electrodes of the first pair; (ii) a second state in which the circuit applies a voltage between the electrodes of the second pair; and (iii) a third state in which the circuit applies a voltage between at least one electrode of the first pair and at least one electrode of the second pair. The different states desirably provide different specific resistances. In third state, current flows in along the length of the flow path between an electrode of the first pair and an electrode of the second pair. In the example discussed above, the current flows through liquid in the elongated passage, along the length of the passage. As further discussed below, this state may provide a specific resistance much higher than the specific resistance in the first or second state. The heater desirably can provide a wide range of specific resistances in a compact structure. Desirably, the electrical circuit is operative to vary the average voltage applied to the electrodes. The combined effects of adjusting the specific resistance by changing between states and varying the voltage can meet a wide range of operating conditions such as varying conductivity of the liquid, varying demand for heat and the like without exceeding the limits of the electrical circuit.

Further aspects of the invention provide a washing appliance such as a dishwasher incorporating a heater as discussed above, and methods of heating a liquid.

DETAILED DESCRIPTION

Figure 1:
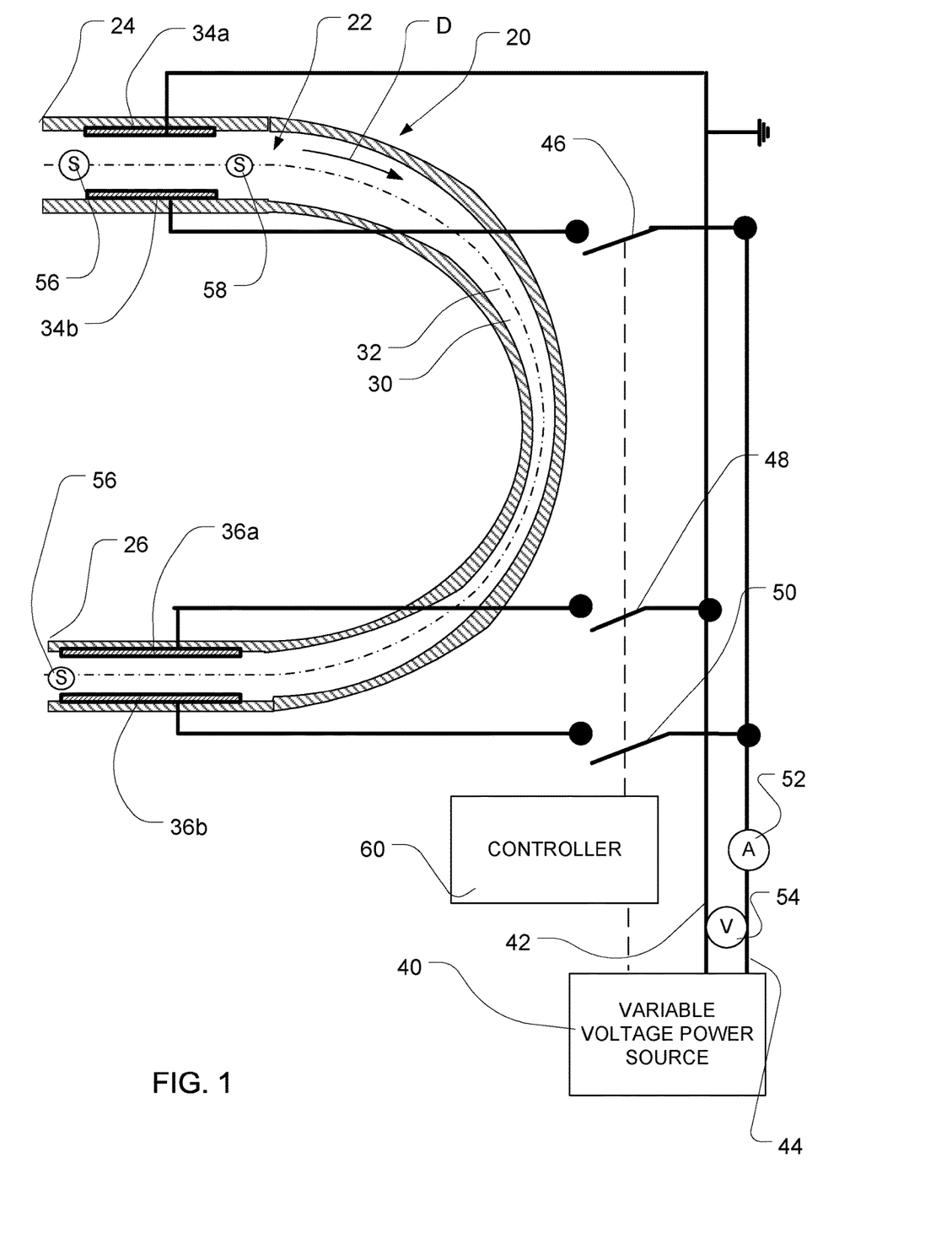
FIG. 1 is a diagrammatic, partially sectional view depicting a heater according to one embodiment of the invention.

A heater in accordance with one embodiment of the invention includes a structure 20 defining a flow path 22 extending in a downstream direction denoted by arrow D in FIG. 1 from an inlet end 24 to an outlet end 26. The flow path 22 includes a straight section adjacent the inlet end 24 and a further straight section adjacent the outlet end 26 as well as an elongated passage 30 connecting the straight sections to one another. In this embodiment, the elongated passageway 30 is curved, but the particular shape illustrated is entirely arbitrary; passage 30 may be straight or may include multiple curves. Also, structure 20 is depicted as a unitary tubular body, but it may be formed from multiple elements connected to one another to define the flow path. As discussed herein, the downstream direction at any point along the flow path should be taken as the direction of the centerline 32 of the flow path. Likewise, directions perpendicular to the downstream direction are directions perpendicular to the centerline at any point along the flow path. The centerline 32 is the line along the flow path 22 through the center of area of the flow path. Of course, in the case of a flow path having a circular cross-section, the center of area is simply the center of the circle of the cross-section.

A first pair of electrodes 34a and 34b are disposed within the straight section of flow path 22 adjacent the inlet end 24 so that elongated passageway 30 lies downstream from the first pair of electrodes. Electrodes 34a and 34b of the first pair are adjacent one another in the downstream direction. In this embodiment, the electrodes 34a and 34b are of the same size and are aligned with one another in the downstream direction, so that the electrodes confront one another over their entire upstream to downstream extent. The electrodes 34a and 34b of the first pair are spaced apart from one another in a direction perpendicular to the downstream direction. These electrodes may be generally plate-like or sheet-like structures. Although electrodes 34a and 34b in this embodiment are mounted to the wall of structure 20, this is not essential; the electrodes may be spaced from the wall if desired. However, the electrodes should be disposed within the flow path 22 so that the electrodes will contact a liquid flowing in the flow path. Desirably, structure 20 is formed in whole or in part from a dielectric material, so that the structure does not form an electrical connection between the electrodes. A second pair of electrodes 36a and 36b is disposed in the straight section of the flow path adjacent the downstream end 26. Thus, the passage 32 is disposed downstream of the first pair 34 but upstream of the second pair 36. The second pair of electrodes is configured similarly to the first pair, so that electrodes 36a and 36b are adjacent one another and aligned with one another in the downstream direction but are spaced from one another in a direction perpendicular to the downstream direction. The spacing direction between the second pair of electrodes may be the same as the spacing direction between the first pair of electrodes, or may be different. In this particular embodiment, second electrodes 36a and 36b are larger in area and closer to one another than first electrodes 34a and 34b. Therefore, a conduction path through the liquid in the flow path between the electrodes 36a and 36b will have a lower specific resistance than a conduction path through the fluid between electrodes 34a and 34b of the first pair.

The heater further includes a variable voltage power source 40. Power source 40 has a first pole 42 and a second pole 44. In this instance, the first pole 42 is a neutral pole, whereas the second pole 44 is a "hot" pole. The power source 40 is arranged to supply electrical power and apply a voltage between poles 42 and 44, which can be controlled and varied as desired over an operating range of voltages. Typically, the power supply applies an alternating voltage to the hot pole while maintaining the neutral pole at a fixed voltage, which may be close to or equal to a ground voltage.

One electrode 34a of the first pair is permanently connected to the neutral pole 42 of the power supply, whereas the other electrode 34b of the first pair is connected through a switch 46 to the hot pole 44 of the power supply. Electrode 36a of the second pair is connected through a switch 48 to the neutral pole 42 of the power supply, whereas the opposite electrode 36b of the second pair is connected through a further switch 50 to the hot pole 44 of the power supply. Switches 46, 48, and 50 are depicted in FIG. 1 as conventional mechanical switches, but most typically the switches 46, 48, and 50 are semiconductor switches such as FETs, MOSFETs or the like, which can be controlled electronically.

The heater further includes an array of sensors arranged to detect one or more conditions of the electrical circuit, the liquid passing through the heater, or both. For example, in this embodiment, the sensors include a current sensor 52 arranged to detect the current flow from the power source 40 and a voltage sensor 54 arranged to detect the voltage between poles 42 and 44. The sensors in this also include sensors which can detect one or more conditions of the liquid passing through the heater as, for example, an input temperature sensor 56 disposed upstream of the first pair of electrodes 34a, 34b and an output temperature sensor 56 disposed downstream of the second pair of electrodes 36a, 36b, as well as a flow sensor 58 disposed within the flow path and arranged to measure the flow rate of liquid through the path. It is not essential to provide all of the sensors depicted in FIG. 1.

The heater further includes a controller 60. The controller 60 is connected to switches 46, 48, and 50, and to the power source 40 so that the controller can command each of the switches independently to enter into a closed state in which the switch conducts or an open state in which the switch does not conduct. The controller is also connected to the power source 40 and is arranged to command the power source to increase or decrease the applied voltage between poles 42 and 44. Controller 60 is also connected to the sensors discussed above so that the controller can receive signals from the sensors. The connections between the controller and the sensors are omitted for clarity of illustration in FIG. 1. Controller 60 may include conventional analog digital circuit elements arranged to perform the operations discussed below. Most typically, the controller includes a digital processor and a memory-containing stored instructions directing the processor to perform the operations. The controller typically also includes appropriate circuits for interfacing with the sensors and with the switches as, for example, analog-to-digital and digital-to-analog conversion circuits.

In the state depicted in FIG. 1, with all switches 46, 48, and 50 open, the heater is inactive. By closing switch 48 and leaving switches 48 and 50 open, can select the electrodes 34a and 34b of the first pair for connection to power source 40, and thus place the electrical circuit in a first state. In this state, electrodes 34a and 34b are connected to opposite poles of the power supply, so that a voltage difference is applied between electrodes 34a and 34b. In this condition, current will flow between these electrodes through the liquid present in flow path 22. Likewise, by opening switch 48 and closing switches 48 and 50, the controller can select the electrodes 36a and 36b of the second pair and connect these electrodes to the opposite poles 42 and 44 of the power supply. In this condition, current flows between electrodes 36a and 36b through the fluid in the space between these electrodes. Because electrodes 34a of the first pair remains connected to the neutral pole, some current may flow from electrodes 36b to electrode 34a through the liquid in the elongated passage 30. However, the specific resistance between electrodes 36a and 36b of the second pair is much lower than the specific resistance between electrode 36b of the second pair and electrode 34a of the first pair due to the elongated and relatively narrow current path through the fluid in passage 30. Therefore, the current will flow primarily between electrodes 36a and 36b.

Controller 60 is also operative to place the circuit into a third state in which switches 46 and 48 are open and switch 50 is closed. In this state, the only current path between the poles of the power supply through any of the electrodes extends between electrode 36b of the second pair and electrode 34a of the first pair, through passage 30. Optionally, controller is operative to place the circuit into a fourth state, in which the electrodes 34a and 34b are connected to opposite poles of the power supply, and electrodes 36a and 36b of the second pair are also connected to opposite poles of the power supply.

As discussed above, the two pairs of electrodes are configured so that they define different specific resistances. Therefore, the heater as a whole can provide four different specific resistances. These specific resistances can be selected so as to cover a broad range with relatively large steps between specific resistances. Typically, the power source 40 has a finite operating range. For example, a voltage source typically will be capable of applying no more than a predetermined maximum voltage between poles 42 and 44, and also will be capable of applying no more than a maximum current through the poles and switches without damage to the power supply or switches. Desirably, the specific resistances provided in the various states are selected so that for any liquid within a predetermined range of conductivities, any heating rate within a predetermined operating range of heating rates can be provided by selecting one of the states discussed above and adjusting the power source through a condition within its operating range.

In one embodiment, the controller may execute a simple control scheme using the outlet temperature of the fluid from the heater as detected by output temperature sensor 58 as a principal input. In this control scheme, the controller initially selects the state having the highest specific resistance, in this case the third state with electrodes 36b and 34a connected to the poles. With the circuit in this state, the controller actuates the power source to apply a low voltage between poles 42 and 44 and to progressively increase this voltage until the output temperature reaches a desired set point value or until the applied voltage reaches a predetermined switching threshold voltage which may be at or just slightly below the maximum operating voltage of the power source. If the threshold voltage is reached before the output temperature reaches the set point value, the controller selects the state with the next lower specific resistance, i.e., the first state discussed above where the electrodes 34a and 34b of the first pair are selected and reduces the voltage applied by the power source. The controller then progressively increases the voltage applied by the power source until either the desired outlet temperature is achieved or another predetermined switching threshold voltage is reached. If this predetermined threshold switching voltage is reached, the controller again reduces the voltage applied by the power source and switches to the next lower available specific resistance, which in this case the second state with electrodes 36a and 36b of the second pair selected. If the threshold switching voltage is reached, the controller will then switch to the fourth state, with the lowest available specific resistance. Of course, if the fluid temperature rises above the desired set point temperature, the controller will perform the same steps in reverse, first reducing the voltage provided by the power source to a selected minimum voltage threshold and then switching to a higher specific resistance state if this minimum voltage threshold is achieved. Optionally, the controller may monitor the current flow as detected by current sensor 52 and reduce the voltage, switch to a higher specific resistance state or both if the current increases to a maximum threshold. This condition may occur, for example, if the conductivity of the liquid increases significantly.

In a more elaborate control scheme, the controller may acquire data representing the conductivity of the liquid by placing the circuit into any one of the states, momentarily actuating the power supply to apply a low voltage between the poles and measuring the current flow with sensor 52. The applied voltage may be measured with sensor 54 or may be known with sufficient accuracy from the voltage commanded by the controller. The known current and voltage, together with the known specific resistance between the poles in each state can be used to calculate the conductivity. The controller may use data from input temperature sensor 56 and flow sensor 58 to estimate the heating rate which will raise the temperature of the liquid to the desired set point and may select a circuit state and applied voltage to achieve the required heating rate while keeping the circuit within its operating range.

Figures 2, 6:
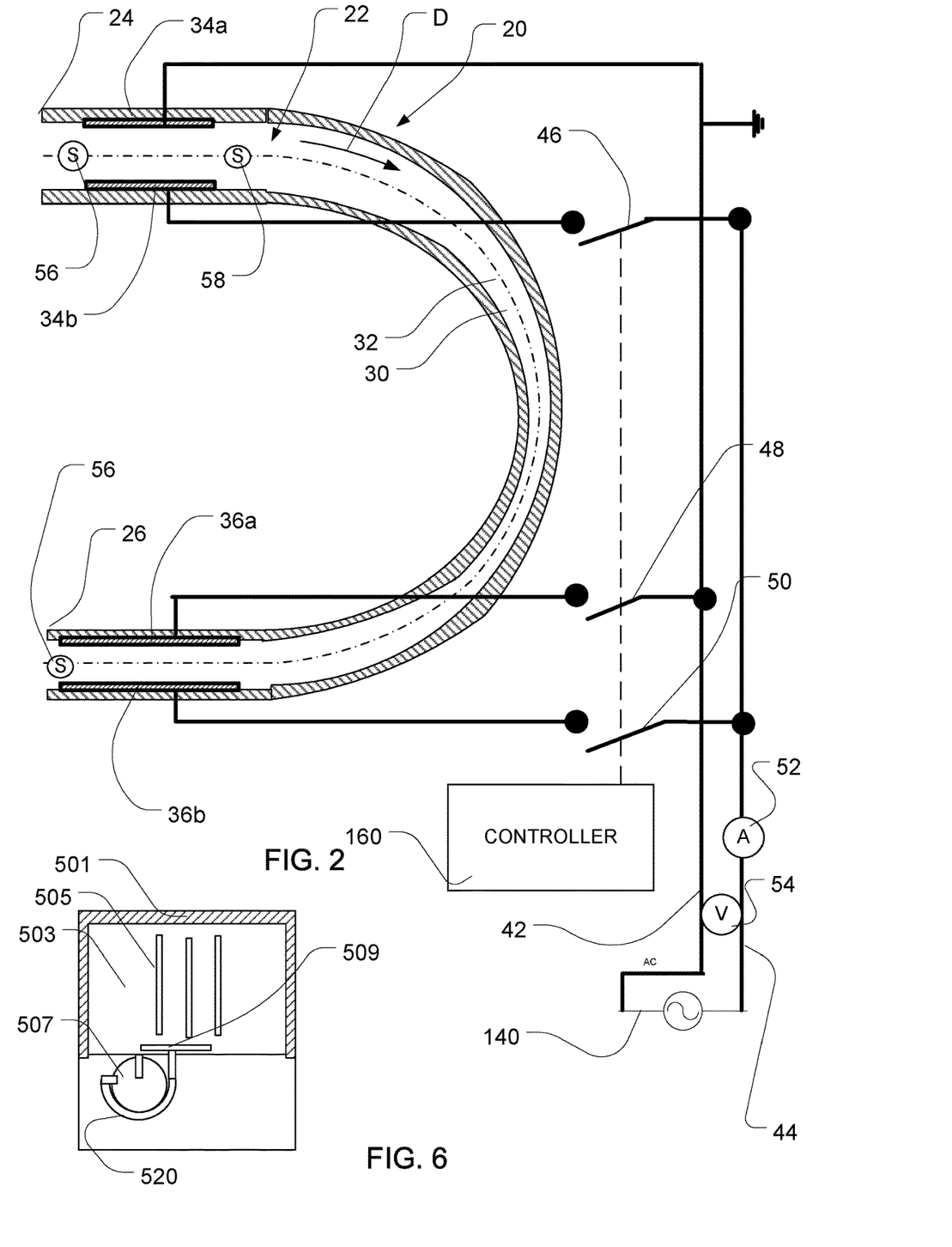
FIG. 2 is a diagrammatic, partially sectional view depicting a heater according to another embodiment of the invention.
FIG. 6 is a diagrammatic view depicting a dish washer according to yet another embodiment of the invention.

A heater according to a further embodiment of the invention (FIG. 2) is identical to the heater discussed above with reference to FIG. 1, except as discussed below. In the heater of FIG. 2, the power source is a fixed-voltage power source as, for example, a utility mains connection. The controller 160 is arranged to vary the voltage by pulse width modulation. Thus, controller 160 is arranged to control the average voltage applied to the selected electrodes by repeatedly opening and closing one or more of the switches associated with the selected electrodes. In the first state, with electrodes 34a and 34b selected, the controller may be arranged to repeatedly open and close switch 46. In the second state, using electrodes 36a and 36b, the controller may repeatedly open and close one or both of switches 48 and 50. Likewise, in the third state, the controller will open and close switch 50. In other respects, the system operates as discussed above. Stated another way, the controller can control the average voltage applied to the selected electrodes either by controlling the voltage applied by the power supply, as in FIG. 1, or by controlling the duty cycle of the connection between the selected electrodes and the power supply, as in FIG. 2.

A heater according to another embodiment (FIG. 3) is similar to the heaters discussed above, except that the heater includes a first pair 234a, 234b of electrodes; a second pair of electrodes 236a and 236b, and a third pair of electrodes 237a and 237b. In this embodiment, the structure 220 defines a flow path 222, including a first elongated passageway 230 between the first and second pairs of electrodes, and a second elongated passageway 231 between the second pair of electrodes 236a and 236b and the third pair of electrodes 237a and 237b. Here again, the electrodes of each pair are disposed adjacent one another in the downstream direction along the flow path. However, in this particular embodiment, the electrodes 236a and 236b of the second pair are disposed in a partially overlapping configuration, whereas the electrodes 237a and 237b of the third pair do not overlap one another in the downstream direction D along the flow path. In this embodiment as well, the various pairs of electrodes are configured so that each pair of electrodes provides a different specific resistance.

Figures 3, 4, 5:
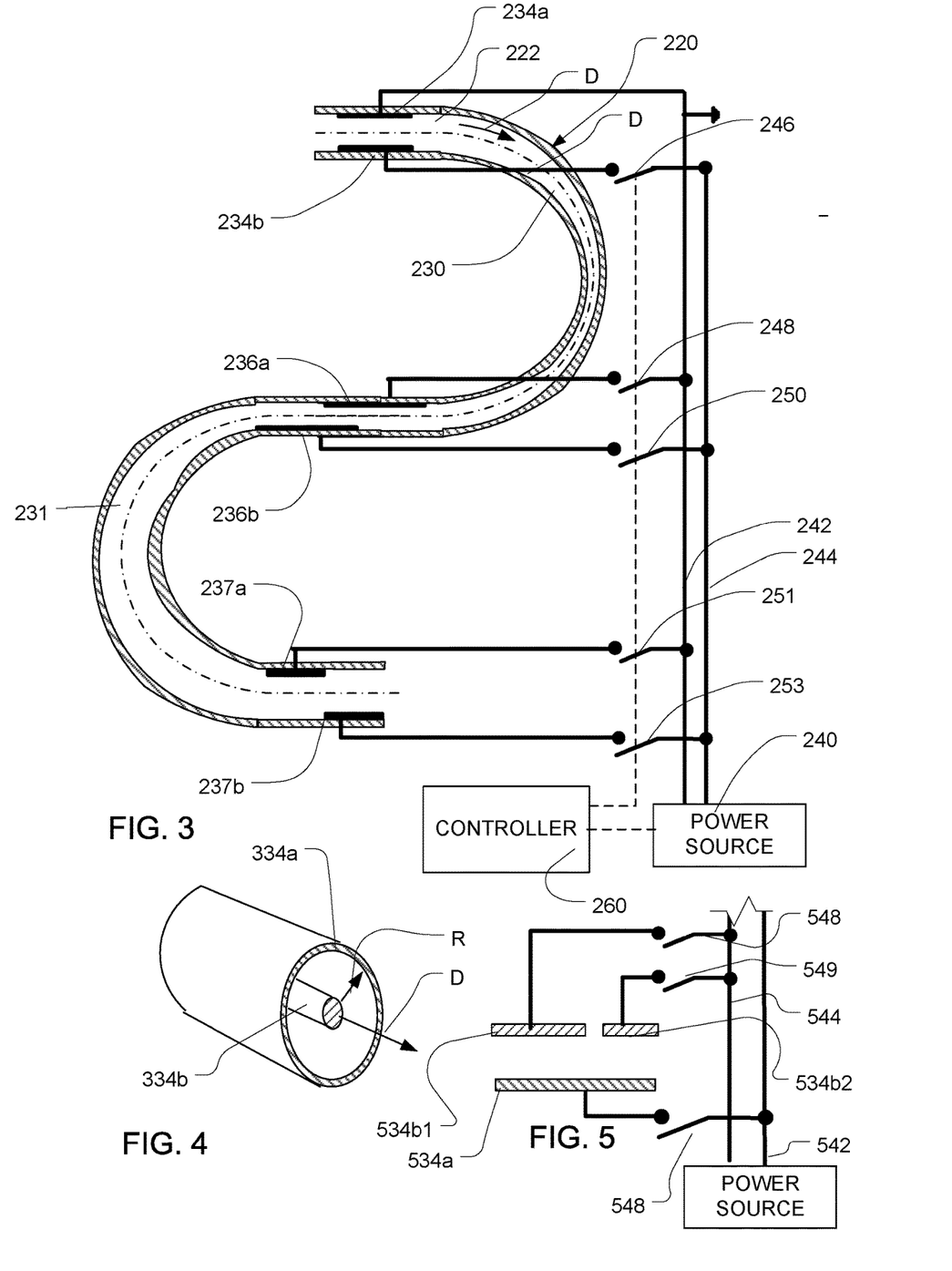
FIG. 3 is a diagrammatic, partially sectional view depicting a heater according to a further embodiment of the invention.
FIG. 4 is a diagrammatic perspective view depicting a pair of electrodes usable in a still further embodiment of the invention.
FIG. 5 is a fragmentary view depicting portions of a heater according to yet another embodiment of the invention.

In this embodiment as well, electrode 234a of the first pair is permanently connected to the neutral pole 242 of power source 240, whereas the remaining electrodes are connected through switches 246, 248, 250, 251, and 253 to the poles of the power supply. Here again, the controller is operative to place a circuit into any of the states discussed above while electrodes 237*a* and 237*b* are disconnected from the power supply. The controller is also operative to place the circuit into additional states. For example, the controller can select only the third pair of electrodes so that with electrodes 237*a* and 237*b* of the third pair are connected to opposite poles. In yet another state, electrode 237*b* of the third pair is connected to the hot pole 244; electrode 237*a* of the third pair is disconnected from the neutral pole; electrode 236*a* of the second pair is connected to the neutral pole and electrode 236*b* of the second pair is disconnected from the hot pole. In this state, poles 244 and 242 are electrically connected to one another through the liquid in the second passage 231. Because second passage 231 has a different configuration than the first passage 230, the specific resistance between the poles in this state will be different from the specific resistance in the third state discussed above where current flows through the liquid in first passageway 230. In yet another state, electrode 237*b* of the third pair is connected to the hot pole and electrode 234*a* of the first pair is connected to the neutral pole via the permanent connection, whereas the remaining electrodes are disconnected from the poles. In this state, the current path between the poles of the power supply extends through the liquid in passageway 231 and the liquid in passageway 230 in series. Such a current path provides the highest specific resistance available.

As discussed above with reference to FIGS. 1 and 2, power source 240 may be a variable voltage power source controlled by controller 260 as discussed above. In another arrangement, power source 240 may be a fixed voltage power source as shown in FIG. 2 and controller 260 may be arranged to repeatedly open and close switches in the current path through the selected electrodes so as to provide pulse width modulation of the applied voltage. As will be appreciated, still other embodiments using a greater number of pairs of electrodes can be employed.

In the embodiments discussed above, the electrodes are plate-like structures extending along opposite sides of the flow path. However, other arrangements can be employed. For example, as depicted in FIG. 4, a pair of electrodes may include an elongated, rod-like electrode 334*b* extending in the downstream direction of the flow path and a tubular electrode 334*a* surrounding the rod-like electrode, the inner diameter of the tubular electrode 334*a* being larger than the outer diameter of the rod-like electrode 334*b* so that the electrodes are spaced from one another in the radial directions R transverse to the downstream direction. Numerous other electrode configurations can be employed.

Typically, the heater will include safety features such as ground electrodes (not shown) disposed in the flow path upstream and downstream from the electrodes connectable to the power supply, the ground electrodes being permanently connected to ground potential.

In a further variant, one or both of the electrodes in a pair of electrodes may be formed in segments. As depicted in FIG. 5, a pair of electrodes includes a first electrode 532*a* which is formed as a single unitary element and a second electrode which is formed as two segments 534*b*1 and 534*b*2. Both segments of the second electrode are disposed adjacent the first electrode in the downstream direction. The first electrode 534*a* is connected through a switch 548 to one pole 542 of the power supply. The segments 534*b*1 and 534*b*2 of the second electrode are connected through separate switches 548 and 549, respectively, to the opposite pole 544 of the power supply, so that each of the segments can be connected to or disconnected from the pole of the power supply independently of the other segment. This arrangement can be used to vary the effective area of segmented electrode, and thus vary the specific resistance when the segmented electrode is selected, such as the specific resistance between the first and second electrodes of the pair or the specific resistance between the segmented electrode and an electrode of another pair. This arrangement can be applied in any or all of the electrode pairs.

In the embodiments depicted in FIGS. 1-3, one electrode is permanently connected to the neutral pole. Optionally, this electrode may be connected to the neutral pole through a further switch operated by the controller.

The heaters discussed above can provide a variety of conduction paths having different specific resistances with a relatively small number of electrodes and a relatively small number of switches. Heaters as discussed herein can be used in any application where a liquid is to be heated. However, they are particularly useful where the conductivity of the liquid is expected to vary over a wide range during operation of the heater. For example, a heater used to heat the water in a washing appliance such as a clothes washer or dishwasher may vary over a very wide range of conductivities during operation. The water supply to the washing appliance typically is potable water which can vary in conductivity due to factors such as the content of the dissolved minerals in the water. Moreover, as the washing appliance operates, its conductivity will typically increase as electrolytes such as ionic components of soap and materials washed from the articles to be washed are added to the water during a wash cycle. Heaters as discussed above can be configured to provide a wide range of specific resistances so that the electrical circuit components remain within their operating range despite drastic changes in conductivity. Moreover, the heater can provide this ability in a very compact structure. The portion of the structure which provides an elongated passage may include a tube of essentially any configuration. In some embodiments, the tube can extend around other components of the appliance. For example, a washing appliance depicted in FIG. 6 is a washing appliance having a housing 501 defining a wash chamber 501. The housing includes a rack (not shown) adapted to hold articles to be washed, in this cases dishes 505 within the wash chamber. A pump 507 is arranged to circulate a wash liquid such as water into the wash chamber so that the wash liquid contacts on the articles to be washed as, for example, by forcing the liquid through a spray device 509. A heater as discussed above includes a structure 520 defining a flow path (not shown) for the wash liquid, the flow path being connected between the outlet of the pump and the spray device 509. A part of the heater structure 520 extends around the pump commonly so that the structure occupies space within the appliance which would otherwise be wasted.

In the heaters discussed above, the passages extending between the pairs of electrodes are elongated and have relatively small cross-sectional areas. That is the cross-sectional area of each passage is smaller than the areas of the electrodes, and the length of the passage is greater than the distance between the electrodes of each pair. Thus, in the heaters discussed above, a conduction path which extends through the passage has a higher specific resistance than any conduction path between electrodes of a pair. However, where the electrodes of a pair are widely spaced from one another and the passage between pairs is short, the conduction path through the passage may have lower specific resistance than the conduction path between electrodes of a pair.

The features disclosed in the various embodiments discussed above can be interchanged among the different embodiments. For example, electrode structures as shown in FIGS. 3, 4 and 5 can be employed in any of the heaters of FIGS. 1 and 2. Accordingly, the foregoing description should be taken by way of illustration, rather than as limiting the present invention.

The invention claimed is:

1. An ohmic heater comprising:
   (a) a structure defining a flow path for liquid extending in a downstream direction;
   (b) a first pair of electrodes disposed within the flow path adjacent one another in the downstream direction but spaced from one another in a direction perpendicular to the downstream direction;
   (c) a second pair of electrodes disposed within the flow path downstream from the first pair of electrodes, the electrodes of the second pair being within the flow path adjacent one another in the downstream directions but spaced from one another in a direction perpendicular to the downstream direction, the structure including a dielectric wall defining a tubular elongated passage forming a part of the flow path between the first pair of electrodes and the second pair of electrodes, the dielectric wall encircling the part of the flow path about an axis extending along the downstream direction so as to define the tubular elongated passage; and
   (d) an electrical circuit including a power source having two poles and configured to vary a voltage applied between the two poles, the electrical circuit being operative in at least three states including:
      (i) a first state in which the circuit applies a variable voltage between the electrodes of the first pair;
      (ii) a second state in which the circuit applies a variable voltage between the electrodes of the second pair; and
      (iii) a third state in which the circuit applies a variable voltage between at least one electrode of the first pair and at least one electrode of the second pair so that, in the third state, the only current path through any of the electrodes extends between the at least one electrode of the second pair and the at least one electrode of the first pair, through the tubular elongated passage, and current flows through the liquid in the tubular elongated passage,
   wherein the electrical circuit has a first specific resistance between the electrodes of the first pair in the first state, the electrical circuit has a second specific resistance between the electrodes of the second pair in the second state, the second specific resistance being different than the first specific resistance, and the electrical circuit has a third specific resistance between the at least one electrode of the second pair and the at least one electrode of the first pair in the third state, the third specific resistance being higher than the first and second specific resistances.

2. The heater as claimed in claim 1 wherein the circuit includes one or more sensors arranged to detect one or more conditions of the circuit, one or more conditions of the liquid passing through the flow path, or both, and a controller operative to set the circuit into one of the first, second and third states responsive to signals from at least one of the sensors.

3. The heater as claimed in claim 2 wherein the controller is operative to control the applied voltage responsive to signals from at least one of the sensors while maintaining the circuit in one of the first, second and third states.

4. The heater as claimed in claim 1 wherein the electrodes of the first pair are at least partially aligned with one another in the downstream direction and the electrodes of the second pair are at least partially aligned with one another in the downstream direction.

5. A washing appliance including the heater as claimed in any of claim 1-3 or 4, a housing defining a wash chamber adapted to hold articles to be washed and a pump arranged to pump a wash liquid through the heater and into the wash chamber so that the wash liquid contacts articles in the wash chamber.

6. The heater as claimed in claim 1 wherein the circuit is operative in a fourth state, in which the electrodes of the first pair are connected to opposite poles of the power source, and the electrodes of the second pair are also connected to opposite poles of the power source.

7. The heater as claimed in claim 1, wherein the power source is configured to vary the voltage applied between the two poles by pulse width modulation.

8. The heater as claimed in claim 1, wherein the electrodes of one of the first pair or the second pair are larger in area than the electrodes of the other of the first pair or the second pair.

9. The heater as claimed in claim 1, wherein the electrodes of one of the first pair or the second pair are closer to one another than the electrodes of the other of the first pair or the second pair.

10. The heater as claimed in claim 1, wherein the electrodes of one of the first pair or the second pair are larger in area and closer to one another than the electrodes of the other of the first pair or the second pair.

11. A method of heating a liquid comprising the steps of:
    (a) passing the liquid in a downstream direction between a first pair of electrodes disposed adjacent one another in the downstream direction but spaced from one another in a direction perpendicular to the downstream direction, then through a tubular elongated passage defined by a dielectric wall and then through a second set of electrodes disposed adjacent one another in the downstream direction but spaced apart from one another in a direction perpendicular to the downstream direction, the dielectric wall defining the tubular elongated passage by encircling a flow path of the liquid about an axis extending along the downstream direction;
    (b) actuating an electrical circuit to apply a variable voltage between the electrodes of the first pair in a first state, between the electrodes of the second pair in a second state, and between at least one electrode of the first pair and at least one electrode of the second pair in a third state in which the only current path through any of the electrodes extends between an electrode of the second pair and an electrode of the first pair, through the tubular elongated passage, and current flows through the liquid in the tubular elongated passage, wherein the electrical circuit has a first specific resistance between the electrodes of the first pair in the first state, the electrical circuit has a second specific resistance between the electrodes of the second pair in the second state, the second specific resistance being different than the first specific resistance, and the electrical circuit has a third specific resistance between the at least one electrode of the second pair and the at least one electrode of the first pair in the third state, the third specific resistance being higher than the first and second specific resistances;

(c) detecting at least one condition of the liquid, the circuit, or both;
(d) controlling the electrical circuit responsive to at least one condition detected in step (c) so as to:
  (i) select the first, second, or third state, and
  (ii) vary the average voltage applied.

12. The method as claimed in claim 11 wherein the step of actuating the electrical circuit includes connecting the electrodes to poles of a power source.

13. The method as claimed in claim 11 wherein the electrical circuit includes a power source having two poles and wherein the step of actuating the electrical circuit further includes actuating the electrical circuit in a fourth state, in which the electrodes of the first pair are connected to opposite poles of the power source, and the electrodes of the second pair are also connected to opposite poles of the power source.

14. The method as claimed in claim 11, wherein controlling the electrical circuit to vary the average voltage applied includes varying the average voltage applied via pulse width modulation.

15. The method as claimed in claim 11, wherein controlling the electrical circuit includes initially selecting the third state and progressively increasing the average voltage applied until either a temperature of the liquid reaches a desired set point value or until the average voltage applied reaches a predetermined switching threshold voltage, and wherein, if the average voltage applied reaches the predetermined switching threshold voltage, the controlling of the electrical circuit further includes: reducing the average voltage applied and selecting either (1) the first state if the first specific resistance is higher than the second specific resistance or (2) selecting the second state if the second specific resistance is higher than the first specific resistance, after which the average voltage applied is progressively increased.

16. A method of heating a liquid comprising the steps of:
(a) passing the liquid in a downstream direction between a first pair of electrodes disposed adjacent one another in the downstream direction but spaced from one another in a direction perpendicular to the downstream direction, then through a second set of electrodes disposed adjacent one another in the downstream direction but spaced apart from one another in a direction perpendicular to the downstream direction;
(b) actuating an electrical circuit to apply a variable voltage between the electrodes of the first pair in a first state, between the electrodes of the second pair in a second state, and between at least one electrode of the first pair and at least one electrode of the second pair in a third state, wherein the electrical circuit has a first specific resistance between the electrodes of the first pair in the first state, the electrical circuit has a second specific resistance between the electrodes of the second pair in the second state, the second specific resistance being lower than the first specific resistance, and the electrical circuit has a third specific resistance between the at least one electrode of the second pair and the at least one electrode of the first pair in the third state, the third specific resistance being higher than the first specific resistance;
(c) detecting a temperature of the liquid;
(d) controlling the electrical circuit responsive to the temperature of the liquid detected in step (c) so as to:
  (i) select the third state and progressively increase the voltage applied until the temperature of the liquid reaches a desired set point value or until the voltage applied reaches a first predetermined switching threshold voltage;
  (ii) then, if the voltage applied in step (d) (i) reaches the first predetermined switching threshold voltage, then select the first state and progressively increase the voltage applied until the temperature of the liquid reaches the desired set point value or until the voltage applied reaches a second predetermined switching threshold voltage; and
  (iii) then, if the voltage applied in step (d) (ii) reaches the second predetermined switching threshold voltage, then select the second state and progressively increase the voltage applied.

* * * * *